Dec. 6, 1927.  
L. A. LAURSEN  
1,652,020  
TIRE MOLD  
Original Filed April 14, 1924    2 Sheets-Sheet 1

Inventor  
L. A. Laursen,  
By Robb Robb Hill  
Attorneys

Inventor
L. A. Laursen,
By Pott, Pott & Hill
Attorneys

Patented Dec. 6, 1927.

1,652,020

UNITED STATES PATENT OFFICE.

LAURITS A. LAURSEN, OF AKRON, OHIO.

TIRE MOLD.

Application filed April 14, 1924, Serial No. 706,526. Renewed October 24, 1927.

In the art of tire manufacture, it is common to use today special molds for holding and giving ultimate contour or form to the tire in the process of vulcanization. It has been proposed, moreover, in this art to utilize hydraulic pressure applied inside of the tire to be molded and cured, for firmly maintaining the tire in contact with the inner walls of the mold in the curing process.

Considerable difficulty is experienced in using tire molds for the purposes set forth, owing to the fact that prior structures of such molds ordinarily embody mold sections between which the tire is formed and cured, between which sections are applied connections for introducing into the tire within the mold the pressure fluid, which may be water. Obviously the employment of such connections as for instance, pipe sections, nipples, or the like, necessitates very tight joints between the mold sections and such parts. Such joints must be ground joints or made with great nicety, and even when so made there is constant liability of leakage of the pressure fluid or water out from the pressure chamber of the mold between the tire and the points at which said tire is in engagement with either the mold or its core.

Usually the mold members of the class upon which I am improving are of annular form and the leakage takes place from the points between the core sections and the tire and mold walls, and around the outer connections above mentioned. Obviously, with leakage taking place, uniform and effective pressure of the hydraulic fluid upon the inner walls of the tire cannot be maintained. The mold sections or members of a complete mold must necessarily be assembled and disassembled, and it is difficult to keep these in such a condition that the joints between parts from which water may leak or pass will not be damaged and it is one of the primary objects of my invention to provide a tire mold structure, overcoming the defects or disadvantages incidental to present types of such molds, for the reasons above set forth.

In the carrying out of my invention I utilize a mold structure in the form of mold members made of solid plates or bodies, each member formed with a mold chamber section or portion to match that of the other member, and each mold member being, furthermore, formed with a solid middle or central portion to match and fit flat against the corresponding portion of the other member. I furthermore employ a pressure fluid passage which leads into the mold chamber of the mold through a solid portion of one of the mold members, so as to avoid all need of special connections or fittings engaged by the members of the mold with ground joints or other engaging portions giving rise to the leakage defects hereinbefore elucidated. The middle or solid central portions of the mold members by fitting flat against each other provide a mold chamber closed effectively at the points where the fluid pressure is conducted into said chamber, and effectively closed at those places where the core sections and the bull ring therefor fit between the mold sections. I form the central portions of the mold members in a peculiar way to provide pressure bosses, the pressure areas of which are in the same planes as the pressure surfaces at the top and bottom of the mold, which surfaces are acted on by the ram which holds the molds assembled in a battery when placed in the vulcanizing chamber to be cured.

In addition to the above features of construction, I employ special coupling means for connecting up the water or hydraulic pressure supply pipes to a coupling member carried by each mold, and my invention includes other specific features of construction, the advantages of which will appear more fully hereinafter.

In the accompanying drawings.

In the accompanying drawings and also in the following description setting forth the construction illustrated thereby, similar reference characters denote similar parts throughout.

Figure 1:
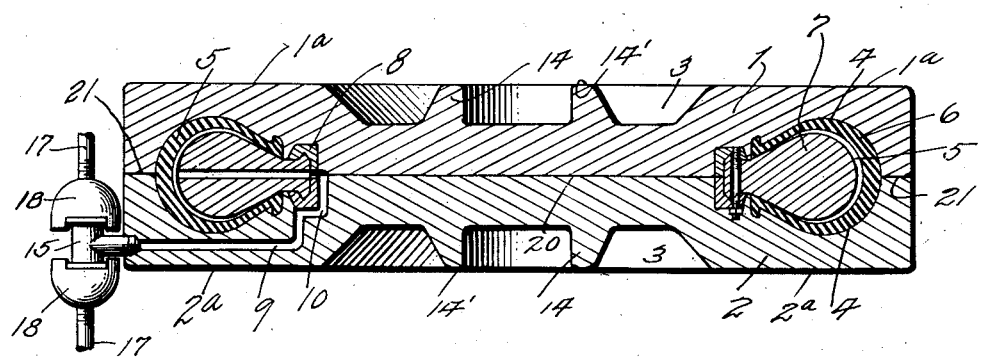
Fig. 1 is a horizontal sectional view taken through a tire mold embodying the invention.
Figure 2:
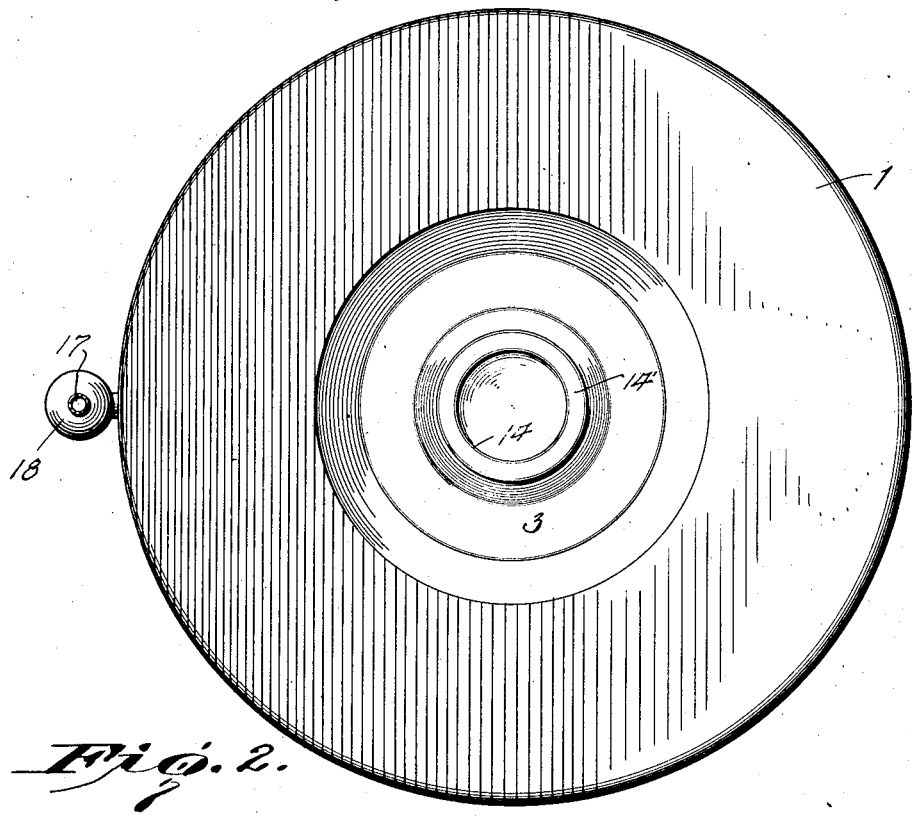
Fig. 2 is a top plan view.
Figure 3:
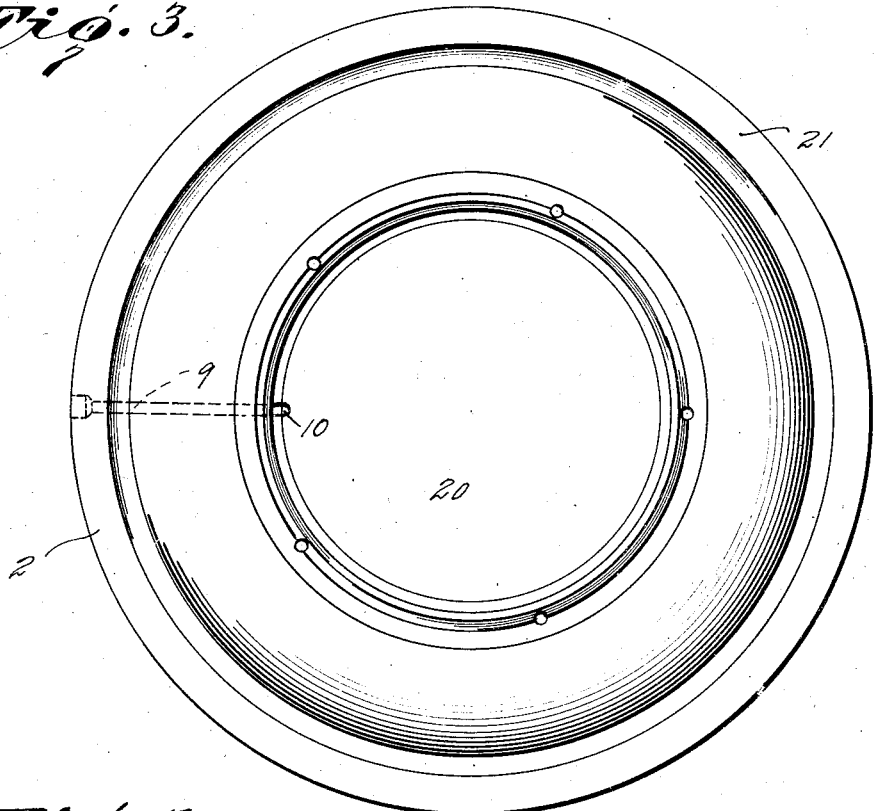
Fig. 3 is a plan view of the lower mold member of my mold.
Figure 4:
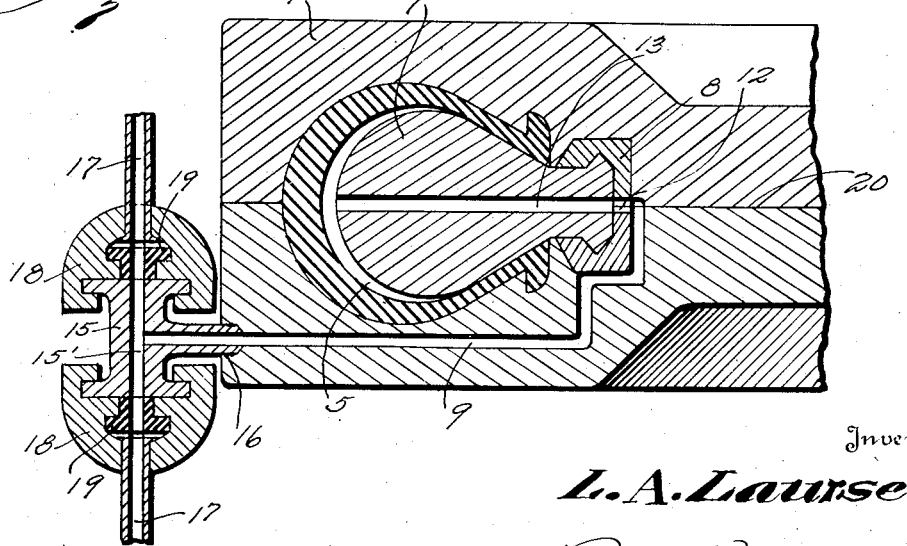
Fig. 4 is an enlarged vertical section showing more clearly the mold chamber of my mold and showing in section the coupling means for the water supply pipes that connect adjacent molds of a battery and supply water to the passage leading to the pressure chamber of each mold.

My entire mold might be simply described as being comprised of complemental upper and lower mold members 1 and 2, respectively. As a tire is a round article the members 1 and 2 are circular in form and I make them in the shape of solid plates cut away somewhat at the central portions as indicated at 3 in order to lighten them by reducing the amount of metal in their construction. The mold members 1 and 2 are each provided with mold chamber sections or portions 4, forming when the members are placed together a mold chamber 5, which receives the tire 6 in the well known manner of such molds. The mold chamber 5, also may receive the core 7, engaged between the side walls of the tire 6, said core being of sectional form, if desired, though not necessarily so. According to my invention the central body portions of the mold members 1 and 2, surrounded by the mold chamber 5, are flat on their adjacent sides and are in abutting relation so as to avoid the provision of any space between said central portions. The purpose of this construction is twofold, in that by the same I afford no possibility of a leakage space for the water or hydraulic pressure fluid that might otherwise escape from within the tire, located in the chamber 5, passing between the base portions of the tire, the core, or the bull ring 8, which I employ for the usual co-operation with the core members. It will be seen on reference to Figures 1 and 4 that I have no need, whatever, for couplings or pipe joints or other finely fitted parts to provide a means to conduct water or pressure fluid into the chamber 5. I simply form at the lower mold member 2 a radial conduit or supply passage 9, having a lateral branch passage 10, leading to and communicating with an opening 12, through the bull or clamping ring 8, which opening communicates with a passage 13, in the core 7. My mold members fit tightly against the sections of the bull ring 8, which clamp against the opposite sides of the innermost portion of the core 7. Furthermore, as the middle body portions of the mold members snugly contact with one another, there can be no possible leakage of the hydraulic pressure fluid from the chamber 5.

I provide central bosses, 14, of hollow form on the mold members 1 and 2, having their outermost pressure areas 14' in the plane of the pressure flats 1ª and 2ª of the mold members 1 and 2, respectively.

Molds of my invention are, of course, assembled in the usual way, one on top of another, when placed in the vulcanizing chamber for the curing of tires to be molded therein. As a convenient means for supplying water or other pressure fluid to the chamber 5 of each mold, I apply a coupling member 15 to the outer end of the passage 9 in the mold member 2, by screwing a nipple 16 thereof into the internal threaded portion of said passage. Water supplied pipes 17 are equipped with couplings 18 engageable with the upper and lower portions of said coupling member 15, and said pipes or tubes 17 communicate with the vertical passage 15' of the coupling member. Both of the couplings 18 are provided with special gaskets 19 in the hollow parts thereof, said gaskets having ends of reduced size to contact with the coupling member 15 and ends of larger size to receive the pressure of the flowing fluid so as to act upon the larger areas of said larger ends to exert pressure to maintain the gaskets 19 firmly in air and water tight connection with the coupling member 15. I may couple and uncouple the couplings 18 relatively to the coupling member 15 by utilizing bayonet slot connections between the two or any other kind of interlocking lug means intermediate said parts 15 and 18, by which they may be detached in the operation of removing the molds from the vulcanizing parts or chamber.

From the foregoing, it will be apparent that to use my mold invention, it is only necessary to place the core 7 with its attached bull ring 8 in proper relation to the tire as usual, dispose the tire with said parts upon the lower mold member 2, place the upper mold member 1 in proper position over the tire, core, and bull ring and make the connections at the coupling parts 15 and 18 after the thus assembled mold has been made ready for the curing operation in the vulcanizing chamber.

The fluid pressure such as water may then be caused to flow into the passage 9 through the opening 12, through the core 7 and into the chamber 5, thereby distending the tire 6 firmly engaging the same with the walls of the mold chamber and maintaining such engagement during the curing process.

I emphasize that when the mold members are assembled, placed in the vulcanizing pot, and the molds engaged by the usual ram, the pressure of the latter is distributed completely over the outer and central portion of the mold members at the flats 1ª and 2ª, and the bosses 14. The middle portions of the mold members are therefore as tightly engaged as it is practicable to make them at their flat meeting faces designated at 20. At the outermost portions, designated 21, the mold members 1 and 2 may be spaced apart approximately one-sixty-fourth (1/64) of an inch so that air that might be contained in the mold chamber 5 may escape.

I have found my mold extremely effective under actual conditions of use; in fact it entirely eliminates lossage of pressure through leakage of the water from the mold chamber 5. There are not required at any place special fitting unions, pipe connections, or the like, that make necessary peculiar and special machine operations on the mold member in order to fit them for use, and also create the possibility of the loss of pressure through leakage to which I have hereinbefore referred. I introduce my pressure medium such as water through the passage 9 in a manner entirely independent of any butting faces or parts of the mold members so far as effective action and usefulness are concerned. By such construction I have greatly simplified the making of tire molds, as well as created a structure of very high efficiency. Furthermore, since by the central body formation of my mold members, I localize the fluid retaining passages and chamber wholly at the outer portions of the mold members, a relatively quick heating of the water introduced into the mold and maintenance of said heat to uniform temperature is attained, something to be desired as compared with ordinary apparatus for the purposes of the invention.

Having thus described my invention what I claim as new, and desire to protect by Letters Patent of the United States, is:

1. A tire mold comprising complemental upper and lower mold members, said mold members being formed with annular mold portions, together constituting a mold chamber of annular form adapted to receive a tire, and said mold members consisting of solid plates, the central portions of which have flat meeting faces in tight abutting engagement and substantially coextensive with the area of those portions of the mold members which are substantially encircled by the tire.

2. A tire mold comprising complemental upper and lower mold members, said mold members being formed with annular mold portions, together consisting a mold chamber of annular form adapted to receive a tire, and said mold members consisting of solid plates, the central portions of which have tight abutting engagement at substantially all portions of the mold members which are encircled by the tire, the mold members having pressure elements at the middle portions thereof for holding the central abutting portions in the engagement stated.

3. A tire mold comprising complemental upper and lower mold members, said mold members being formed with annular mold portions, together constituting a mold chamber of annular form adapted to receive a tire, and said mold members consisting of solid plates, the central portions of which have tight abutting engagement at substantially the entire portions of the mold members which are substantially encircled by the tire, the mold members having pressure elements at the middle portions thereof for holding the central abutting portions in the engagement stated, and the outer sides of the mold members being formed with pressure flats in the same plane as the pressure elements at the central portions of the mold members.

4. A tire mold comprising complemental upper and lower mold members, said mold members being formed with annular mold portions, together constituting a mold chamber of annular form adapted to receive a tire, and said mold members consisting of solid plates, the central portions of which have tight abutting engagement at substantially all portions of the mold members which are encircled by the tire, one of said mold members being formed with a conduit therein leading from its outermost portion inwardly and laterally to supply a fluid pressure medium to the mold chamber.

5. A tire mold comprising complemental mold members formed at their outer portions with annular pressure chamber portions which match together and constitute a tire pressure chamber, said mold members being provided at the portions surrounded by said chamber with flat abutting faces extending substantially over the whole area encircled by the chamber, and means at the central portions of the mold members for applying external pressure to the mold members when assembled for a curing operation, to maintain said flat abutting faces in said engagement, and means leading to the pressure chamber to supply a pressure medium thereto.

6. A tire mold comprising complemental mold members formed at their outer portions with annular pressure chamber portions which match together and constitute a tire pressure chamber, said mold members being provided at the portions surrounded by said chamber with flat abutting faces extending substantially over the whole area encircled by the chamber, and means at the central portions of the mold members for applying external pressure to the mold members when assembled for a curing operation, to maintain said flat abutting faces in said engagement, and means leading to the pressure chamber to supply a pressure medium thereto, and comprising a passage wholly formed in one of the mold members and leading from a point externally thereof.

7. A tire mold comprising complemental mold members formed with annular chamber portions to match one another to constitute a tire pressure chamber, a core adapted to be received by said chamber, a bull ring attached to said core, the said mold members consisting of solid plates having substantially all the portions thereof surrounded by the tire chamber formed with flat abutting faces or surfaces and also formed so as to receive and snugly fit against the said bull ring and core, and the outer portions of said mold members being provided with pressure elements at their central portions to firmly hold the said abutting faces or surfaces in tight engagement against one another, one of the mold members having a pressure fluid medium supply conduit leading to the pressure chamber aforesaid.

8. A tire mold comprising complemental mold members formed with annular chamber portions to match one another to constitute a tire pressure chamber, a core adapted to be received by said chamber, a bull ring attached to said core, the said mold members consisting of solid plates having substantially the entire portions thereof surrounded by the tire chamber formed with flat abutting faces or surfaces and also formed so as to receive and snugly fit against the said bull ring and core, and the outer portions of said mold members being provided with pressure elements at their central portions to firmly hold the said abutting faces or surfaces in tight engagement against one another, one of the mold members having a pressure fluid medium supply conduit leading to the pressure chamber aforesaid, and extending radially from the outermost portion of said member inwardly and thence laterally to the bull ring, the bull ring having an opening, and the core a passage communicating with said laterally extended portion of the conduit, and the outer portions of the mold members having at opposite sides of the pressure chamber pressure flats which are located in the same plane as the pressure areas of the pressure elements at the central portions of the mold members.

9. A tire mold comprising complemental mold members, each provided with an outer annular mold portion, and the mold portions of the members together constituting an annular mold chamber, the mold members consisting of plates having internal central flat portions extending across the space surrounded by the annular mold portions, and said flat portions disposed to fit tightly one against the other, and pressure elements adjacent to the central flat portions aforesaid to positively hold them together with their faces in a flatwise abutting relation.

In testimony whereof I affix my signature.

LAURITS A. LAURSEN.